United States Patent

Tamura et al.

(10) Patent No.: US 6,729,123 B2
(45) Date of Patent: May 4, 2004

(54) EXHAUST PURIFICATION DEVICE FOR INTRACYLINDRICAL INJECTION-TYPE SPARK-IGNITION INTERNAL COMBUSTION ENGINE

(75) Inventors: Yasuki Tamura, Tokyo (JP); Kazuhito Kawashima, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/204,980

(22) PCT Filed: Dec. 28, 2001

(86) PCT No.: PCT/JP01/11654
§ 371 (c)(1),
(2), (4) Date: Aug. 28, 2002

(87) PCT Pub. No.: WO02/053889
PCT Pub. Date: Jul. 11, 2002

(65) Prior Publication Data
US 2003/0029163 A1 Feb. 13, 2003

(30) Foreign Application Priority Data

Dec. 28, 2000 (JP) .......... 2000-400304
Nov. 13, 2001 (JP) .......... 2001-347564
Dec. 20, 2001 (JP) .......... 2001-388237

(51) Int. Cl.$^7$ .............................................. F01N 3/00
(52) U.S. Cl. .................... 60/285; 60/284; 60/286; 60/292; 60/324; 123/299; 123/300
(58) Field of Search ............... 60/274, 276, 277, 60/284, 285, 292, 286, 324; 123/299, 300

(56) References Cited

U.S. PATENT DOCUMENTS

| 5,967,113 | A | | 10/1999 | Kaneko et al. |
| 5,975,046 | A | * | 11/1999 | Kaneko et al. ............. 123/300 |
| 6,178,743 | B1 | * | 1/2001 | Hirota et al. ................. 60/277 |
| 6,321,530 | B1 | * | 11/2001 | Hoshi et al. ................. 60/274 |
| 6,370,869 | B1 | * | 4/2002 | Hirota et al. ................. 60/276 |
| 6,378,296 | B1 | * | 4/2002 | Yasui et al. ................... 60/277 |
| 6,519,931 | B2 | * | 2/2003 | Fujieda et al. ................ 60/280 |

FOREIGN PATENT DOCUMENTS

| EP | 1 030 046 A2 | 8/2000 |
| JP | 3-117611 | 5/1991 |
| JP | 4-183921 A | 6/1992 |
| JP | 7-103003 A | 4/1995 |
| JP | 2000-303824 A | 10/2000 |

* cited by examiner

*Primary Examiner*—Binh Tran
(74) *Attorney, Agent, or Firm*—Birch, Stewart, Kolasch & Birch, LLP (57) ABSTRACT

When an internal combustion engine is in a cold state (S12), fuel is injected during compression stroke with burn air/fuel ratio controlled so as to produce a slight lean air/fuel mixture equivalent to or slightly leaner than a stoichiometric air/fuel mixture (compression S/L operation) (S14), and also exhaust gas flow is restrained (S16).

13 Claims, 7 Drawing Sheets

EXHAUST PURIFICATION DEVICE FOR INTRACYLINDRICAL INJECTION-TYPE SPARK-IGNITION INTERNAL COMBUSTION ENGINE

This application is the national phase under 35 U.S.C. §371 of PCT International Application No. PCT/JP01/11654 which has an International filing date of Dec. 28, 2001, which designated the United States of America.

BACKGROUND OF THE INVENTION

1. Field of the Invention

The present invention relates to an exhaust gas purifying device for an in-cylinder injection spark ignition type internal combustion engine, and more particularly, to techniques of improving the exhaust gas purifying efficiency to enhance the effect of reducing the emission quantity of harmful matter contained in exhaust gas.

2. Description of the Related Art

As one of techniques for reducing harmful matter (including not only unburned matter such as HC, CO, and $H_2$ but smoke, $NO_x$, etc.) contained in exhaust gas, there has been known an exhaust gas purifying technique utilizing reaction with the aid of catalyst.

This exhaust gas purifying technique is, however, disadvantageous in that unburned matter such as HC is discharged into the atmosphere before the catalyst is activated. The disadvantage can pose a grave problem because the quantity of harmful matter discharged before the catalyst is activated occasionally accounts for 90% of the total emission quantity during cold-mode operation.

To solve the problem, a two-stage combustion technique (or two-stage injection technique) for an in-cylinder injection spark ignition type internal combustion engine has been proposed. According to this technique, fuel injection is carried out in two stages, that is, a main injection (with the air/fuel ratio so set as to provide an ultra-lean mixture) and an auxiliary injection which is performed in or after the expansion stroke to cause oxygen remaining after a main combustion (stratified combustion) following the main injection to react with unburned fuel of the auxiliary injection in an exhaust system (including parts of the engine from the combustion chamber to the catalytic converter), thereby reducing harmful matter and quickening the activation of the catalyst.

There has also been proposed a technique of accelerating the reaction by increasing the exhaust pressure (by restraining the exhaust gas flow) and thereby quickening the activation of the catalyst in cold mode, as disclosed in Unexamined Japanese Patent Publications (KOKAI) No. 3-117611 and No. 4-183921, for example.

Further, a combination of these techniques also has been developed wherein the two-stage combustion is carried out while at the same time the exhaust pressure is increased, to quicken the activation of the catalyst in cold mode.

In the case where the two-stage combustion is performed, however, although the reaction in the exhaust system can be drastically accelerated and the catalyst can be activated quickly, a problem arises in that the auxiliary injection leads to a correspondingly lower fuel efficiency because the fuel injected in the auxiliary injection does not directly contribute to the production of engine torque.

Also, in the case of the two-stage combustion, the air/fuel ratio needs to be controlled such that the air/fuel mixture burned in the main combustion following the main injection should be ultra-lean. There is naturally a limit to the engine torque that can be produced, and if the exhaust pressure is increased, the exhaust resistance also increases, making it difficult even to maintain the limit. Such a limit on the engine torque is undesirable because the driver's demand for acceleration may fail to be satisfied.

SUMMARY OF THE INVENTION

An object of the present invention is to provide an exhaust gas purifying device for an in-cylinder injection spark ignition type internal combustion engine, which device is capable of minimizing lowering of the fuel efficiency even during cold-mode operation, and improving the exhaust gas purifying efficiency to restrain the emission quantity of harmful matter while at the same time ensuring acceleration performance.

To achieve the object, the present invention provides an exhaust gas purifying device for an in-cylinder injection spark ignition type internal combustion engine including an injection valve for injecting fuel directly into a combustion chamber, fuel injection control means for controlling the injection of fuel by the injection valve, and air/fuel ratio control means for controlling burn air/fuel ratio. The exhaust gas purifying device comprises a catalytic converter arranged in an exhaust passage for purifying harmful matter in exhaust gas, catalyst activation determining means for determining an activated state of the catalytic converter, compression-stroke slight-lean operation means for causing the air/fuel ratio control means to control the burn air/fuel ratio to produce a slight lean air/fuel mixture equivalent to or slightly leaner than a stoichiometric air/fuel mixture and also causing the fuel injection control means to inject fuel in a compression stroke, to thereby carry out a compression-stroke slight-lean operation, and exhaust gas flow control means for restraining an exhaust gas flow in the exhaust passage, wherein when it is judged by the catalyst activation determining means that the catalytic converter is not in the activated state, the compression-stroke slight-lean operation is performed by the compression-stroke slight-lean operation means and also the exhaust gas flow in the exhaust passage is restrained by the exhaust gas flow control means.

It has been thought hitherto that in the case of an in-cylinder injection spark ignition type internal combustion engine, if fuel is injected in the compression stroke, the spark plug is likely to be wetted because fuel is injected in the vicinity of the spark plug. As a result of experiments conducted by the applicant hereof, however, it was found that when fuel was injected in the compression stroke especially while the engine was in a cold state, the injected fuel actually showed a satisfactory spray pattern with less wetting of the spark plug. It was also found that a large quantity of CO (carbon monoxide) was produced while at the same time ensuring the engine torque. In accordance with the findings, when the engine is in a cold state, the compression-stroke slight-lean operation is carried out wherein the burn air/fuel ratio is so controlled as to produce a slight lean air/fuel mixture equivalent to or slightly leaner than the stoichiometric air/fuel mixture and fuel is injected in the compression stroke, thereby to discharge CO into the exhaust passage as unburned matter together with the residual oxygen ($O_2$), and also the exhaust gas flow is restrained at the same time.

Consequently, while the engine is in a cold state and the catalytic converter is not yet activated, the exhaust gas can be made to contain a large quantity of CO as unburned matter along with $O_2$, without carrying out the auxiliary injection of the two-stage combustion. CO reacts with $O_2$ more easily than HC, so that the reaction in the exhaust system is further accelerated also with the aid of the exhaust gas flow restraining effect. It is therefore possible to improve the exhaust gas purifying efficiency with the air/fuel mixture as a whole set to a slightly lean mixture to restrain the fuel efficiency from lowering while at the same time ensuring the engine torque, and also to quicken the activation of the catalytic converter.

The exhaust gas purifying device of the present invention may further comprise exhaust port ambient temperature detecting means for detecting temperature of or ambient temperature of an exhaust port extending from the combustion chamber to the exhaust passage. When it is judged by the catalyst activation determining means that the catalytic converter is not in the activated state and also the temperature or ambient temperature of the exhaust port detected by the exhaust port ambient temperature detecting means is higher than or equal to a predetermined temperature, the compression-stroke slight-lean operation is carried out and also the exhaust gas flow is restrained.

The experiments conducted by the applicant hereof confirmed that the reaction of CO in the exhaust system was accelerated inside the exhaust port into which the exhaust gas flows directly from the combustion chamber. The rate of the reaction increases with increase in the temperature of the exhaust port, and accordingly, when the engine is in a cold state and if the ambient temperature of the exhaust port is higher than or equal to the predetermined temperature, the compression-stroke slight-lean operation is carried out to discharge CO into the exhaust passage as unburned matter together with the residual $O_2$, and also the exhaust gas flow is restrained.

Thus, while the engine is in a cold state and the catalytic converter is not yet activated, the reaction of CO with $O_2$ in the exhaust system is more appropriately accelerated, whereby the exhaust gas purifying efficiency can be further improved while restraining the fuel efficiency from lowering and at the same time ensuring the engine torque, and also the catalytic converter can be activated more quickly.

The exhaust gas purifying device of the present invention may further comprise two-stage combustion operation means for supplying fuel for main combustion into the combustion chamber and then again supplying fuel into the combustion chamber at a time after extinction of flame produced by the main combustion and before opening of an exhaust valve, to thereby carry out a two-stage combustion operation. When it is judged by the catalyst activation determining means that the catalytic converter is not in the activated state, one of the two-stage combustion operation and the compression-stroke slight-lean operation is selectively carried out by the two-stage combustion operation means or the compression-stroke slight-lean operation means, and also the exhaust gas flow is restrained.

Accordingly, the two-stage combustion operation or the compression-stroke slight-lean operation can be suitably selected in accordance with the operating conditions of the engine. Where the two-stage combustion operation is selected and also the exhaust gas flow is restrained, the exhaust gas purifying efficiency can be improved while preferentially quickening the activation of the catalyst. On the other hand, where the compression-stroke slight-lean operation is selected and also the exhaust gas flow is restrained, the exhaust gas purifying efficiency can be improved while preferentially restraining the fuel efficiency from lowering and at the same time ensuring the engine torque.

Also, in the exhaust gas purifying device according to the present invention, when it is judged by the catalyst activation determining means that the catalytic converter is not in the activated state, the two-stage combustion operation may be carried out first, followed by the compression-stroke slight-lean operation.

Thus, when the catalytic converter is not in the activated state, the two-stage combustion operation is carried out first while at the same time the exhaust gas flow is restrained, whereby the catalyst can be quickly activated. At the time when the catalyst has been activated to a certain degree, the operation is switched to the compression-stroke slight-lean operation, whereby the exhaust gas purifying efficiency can be effectively improved while restraining the fuel efficiency from lowering and also securing the engine torque.

In the exhaust gas purifying device according to the present invention, when the compression-stroke slight-lean operation is carried out, the exhaust gas flow control means sets a restraint quantity for restraining the exhaust gas flow to a value greater than that applied when the two-stage combustion operation is carried out.

Specifically, during the two-stage combustion operation in which the air/fuel ratio for the main combustion is set so as to produce an ultra-lean mixture, the quantity of intake air is large and thus the flow rate of exhaust gas is high. Thus, even if the restraint quantity for restraining the exhaust gas flow is relatively small, the exhaust gas flow can be easily restrained to accelerate the reaction in the exhaust system. However, during the compression-stroke slight-lean operation, the flow rate of exhaust gas is low, and therefore, the restraint quantity for restraining the exhaust gas flow is increased to reliably restrain the exhaust gas flow.

Consequently, the exhaust gas purifying efficiency can be more effectively improved while restraining the fuel efficiency from lowering and at the same time ensuring the engine torque.

Also, the exhaust gas purifying device of the present invention may further comprise load detecting means for detecting a load on the engine. When the load of the engine detected by the load detecting means is higher than or equal to a predetermined value, the compression-stroke slight-lean operation is carried out preferentially over the two-stage combustion operation.

Thus, when acceleration is demanded even while the catalytic converter is still not in the activated state, the compression-stroke slight-lean operation is carried out preferentially over the two-stage combustion operation, whereby the exhaust gas purifying efficiency can be improved while restraining the fuel efficiency from lowering and at the same time ensuring the engine torque.

The exhaust gas purifying device of the present invention may further comprise intake-stroke slight-lean operation means for causing the air/fuel ratio control means to control the burn air/fuel ratio to produce a slight lean air/fuel mixture equivalent to or slightly leaner than a stoichiometric air/fuel mixture and also causing the fuel injection control means to inject fuel in an intake stroke, to thereby carry out an intake-stroke slight-lean operation. When it is judged by the catalyst activation determining means that the catalytic converter is not in the activated state, one of the compression-stroke slight-lean operation and the intake-stroke slight-lean operation is selectively carried out by the compression-stroke slight-lean operation means or the intake-stroke slight-lean operation means, and also the exhaust gas flow is restrained.

Accordingly, the compression-stroke slight-lean operation or the intake-stroke slight-lean operation can be suitably selected in accordance with the operating conditions of the engine. Where the compression-stroke slight-lean operation is selected and also the exhaust gas flow is restrained, the exhaust gas purifying efficiency can be improved while preferentially restraining the fuel efficiency from lowering and at the same time ensuring the engine torque. On the other hand, where the intake-stroke slight-lean operation is selected and also the exhaust gas flow is restrained, the exhaust gas purifying efficiency can be improved while preferentially securing the engine torque.

Also, in the exhaust gas purifying device according to the present invention, when it is judged by the catalyst activation determining means that the catalytic converter is not in the activated state, the compression-stroke slight-lean operation may be carried out first, followed by the intake-stroke slight-lean operation.

Thus, when the catalytic converter is not in the activated state, the compression-stroke slight-lean operation is carried out first while at the same time the exhaust gas flow is restrained, whereby sufficient engine torque can be secured while restraining the fuel efficiency from lowering. At the time when the catalyst has been activated to a certain degree, the operation mode is switched to the intake-stroke slight-lean operation, whereby the engine torque can be secured more reliably while at the same time the exhaust gas purifying efficiency can be effectively improved.

In the exhaust gas purifying device according to the present invention, when the intake-stroke slight-lean operation is carried out, the exhaust gas flow control means sets a restraint quantity for restraining the exhaust gas flow to a value greater than that applied when the compression-stroke slight-lean operation is carried out.

Specifically, during the compression-stroke slight-lean operation in which stratified combustion takes place, the quantity of intake air is relatively large and thus the flow rate of exhaust gas is relatively high. Thus, even if the restraint quantity for restraining the exhaust gas flow is somewhat small, the exhaust gas flow can be restrained to accelerate the reaction in the exhaust system. However, during the intake-stroke slight-lean operation, the exhaust gas flow rate is even lower, and therefore, the restraint quantity for restraining the exhaust gas flow is increased to reliably restrain the exhaust gas flow.

Consequently, the exhaust gas purifying efficiency can be more effectively improved while restraining the fuel efficiency from lowering and at the same time securing sufficient engine torque.

Also, the exhaust gas purifying device of the present invention may further comprise load detecting means for detecting a load on the engine. When the load of the engine detected by the load detecting means is higher than or equal to a predetermined value, the intake-stroke slight-lean operation is carried out preferentially over the compression-stroke slight-lean operation.

Thus, when acceleration is demanded even while the catalytic converter is still not in the activated state, the intake-stroke slight-lean operation is carried out preferentially over the compression-stroke slight-lean operation, whereby the exhaust gas purifying efficiency can be improved while restraining the fuel efficiency from lowering and at the same time securing sufficiently high engine torque.

In the exhaust gas purifying device according to the present invention, the catalyst activation determining means uses, as a parameter, at least one of time elapsed from start of the engine, temperature of cooling water of the engine, temperature of lubricating oil of the engine, temperature of the catalytic converter, flow rate of the exhaust gas, and total quantity of heat applied to the catalytic converter, to determine the activated state of the catalytic converter.

Thus, the activated state of the catalytic converter can be determined with ease based on the time elapsed from the start of the engine, the temperature of the cooling water of the engine, the temperature of the lubricating oil of the engine, the temperature of the catalytic converter, the flow rate of the exhaust gas, the total quantity of heat applied to the catalytic converter, etc.

Also, in the exhaust gas purifying device according to the present invention, the exhaust gas flow control means reduces either cross-sectional area of the exhaust passage or opening of an exhaust choke valve arranged in the exhaust passage, to thereby restrain the exhaust gas flow in the exhaust passage.

Accordingly, the exhaust gas flow in the exhaust passage can be easily restrained by reducing the cross-sectional area of the exhaust passage or the opening of the exhaust choke valve arranged in the exhaust passage.

In the exhaust gas purifying device according to the present invention, the load detecting means detects the load of the engine based on at least one of throttle valve opening, intake manifold pressure, and intake air quantity.

Thus, the load of the engine can be detected with ease based on the throttle valve opening, the intake manifold pressure, the intake air quantity, etc.

DETAILED DESCRIPTION OF THE INVENTION

Embodiments of the present invention will be hereinafter described with reference to the accompanying drawings.

Figure 1:
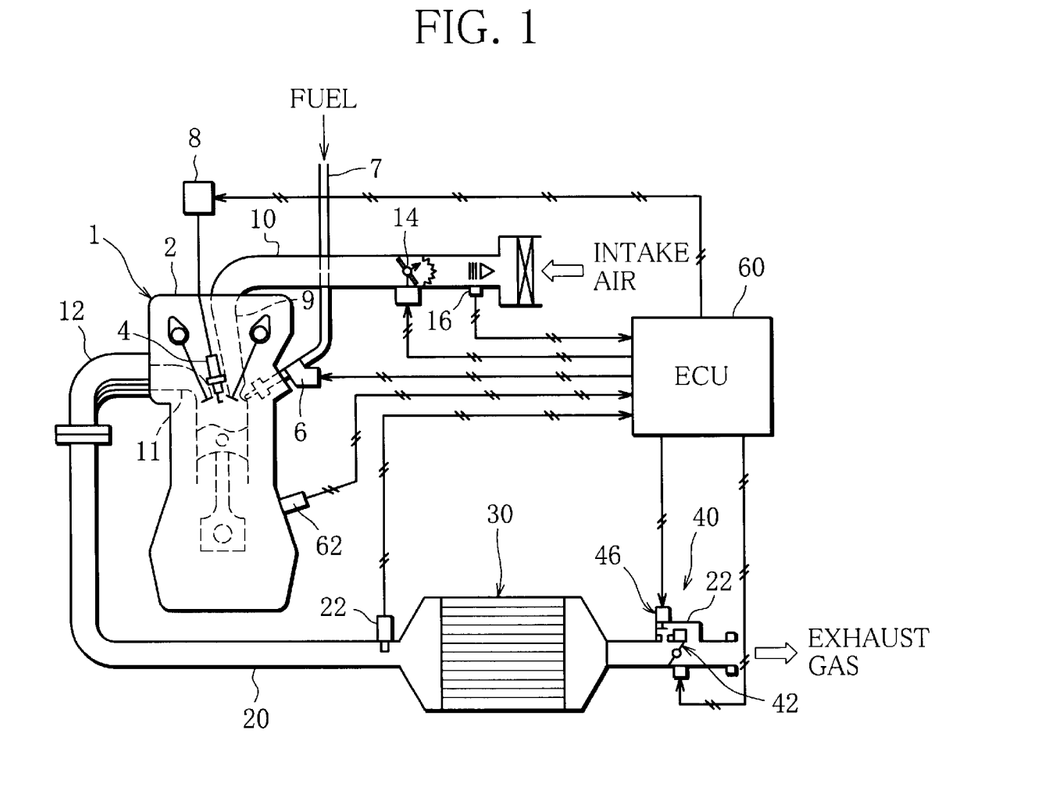
FIG. 1 is a diagram showing a schematic construction of an exhaust gas purifying device for an in-cylinder injection spark ignition type internal combustion engine according to the present invention.

Referring to FIG. 1, there is shown a schematic construction of an exhaust gas purifying device according to the present invention, which is applied to an in-cylinder injection spark ignition type internal combustion engine mounted on a motor vehicle. In the following, the construction of the exhaust gas purifying device will be described.

As shown in the figure, for an engine body (hereinafter merely referred to as engine) 1 which is an internal combustion engine, an in-cylinder injection spark ignition type gasoline engine is used which is capable of switchover of fuel injection mode between fuel injection in intake stroke (intake-stroke injection) and fuel injection in compression stroke (compression-stroke injection).

By switching the fuel injection mode and also carrying out air/fuel ratio control, the in-cylinder injection engine 1 can readily perform an operation in a lean air/fuel ratio (lean air/fuel ratio operation), besides an operation in a stoichiometric (STOICHIO) air/fuel ratio, and an operation in a rich air/fuel ratio (rich air/fuel ratio operation). Further, with this in-cylinder injection engine 1, two-stage combustion mode can also be selected to perform two-stage combustion operation wherein main fuel injection for main combustion is performed in the compression stroke and, in addition, auxiliary injection is performed in or after the expansion stroke.

The engine 1 has a cylinder head 2, to which are mounted spark plugs 4 and solenoid-operated fuel injection valves 6 associated with respective cylinders. Thus, fuel can be injected directly into respective combustion chambers.

Each spark plug 4 is connected to an ignition coil 8 for outputting high voltage. Also, each fuel injection valve 6 is connected, via a fuel pipe, to a fuel supply device (not shown) including a fuel tank. More specifically, the fuel supply device has a low-pressure fuel pump and a high-pressure fuel pump. Thus, fuel in the fuel tank is supplied under low or high pressure to the individual fuel injection valves 6, so that the fuel can be injected at a desired fuel pressure from the injection valves 6 into the respective combustion chambers.

The cylinder head 2 has intake ports 9 formed therein corresponding to each cylinder and extending nearly in an upright direction. An intake manifold 10 has one end connected to the intake ports 9 in communication therewith. The intake manifold 10 is provided with a solenoid-operated throttle valve 14 for controlling the quantity of intake air and also with an intake air quantity sensor 16 for detecting the intake air quantity. For the intake air quantity sensor 16, a Kármán vortex airflow sensor is used, for example.

The cylinder head 2 also has exhaust ports 11 formed therein corresponding to each cylinder and extending substantially in a horizontal direction, and an exhaust manifold 12 has one end connected to the exhaust ports 11 in communication therewith. For the exhaust manifold 12, a dual exhaust manifold system is used. Alternatively, the exhaust manifold 12 may be a single exhaust manifold system or a clamshell type exhaust manifold system.

The in-cylinder injection engine 1 is identical with one already known in the art, and therefore, detailed description of its construction is omitted.

To the other end of the exhaust manifold 12 is connected an exhaust pipe (exhaust passage) 20, in which a three-way catalyst (catalytic converter) 30 serving as an exhaust gas purifying catalytic device is arranged. The three-way catalyst 30 has a carrier on which is supported an active noble metal such as copper (Cu), cobalt (Co), silver (Ag), platinum (Pt), rhodium (Rh) or palladium (Pd).

Also, as shown in the figure, an exhaust pressure sensor 22 for detecting the exhaust pressure is attached to the exhaust pipe 20.

Further, an exhaust pressure control valve (exhaust gas flow control means, or exhaust choke valve) 40 serving as an exhaust gas flow controller is arranged in a portion of the exhaust pipe 20 on the downstream side of the three-way catalyst 30.

The exhaust pressure control valve 40 is designed to restrain the flow of exhaust gas and thereby promote reduction of harmful matter (including $NO_x$, smoke, $H_2$, etc., besides unburned matter such as HC and CO) in the exhaust gas. The control valve 40 is capable of varying at least one of the pressure, density and flow velocity of the exhaust gas.

Figure 2:
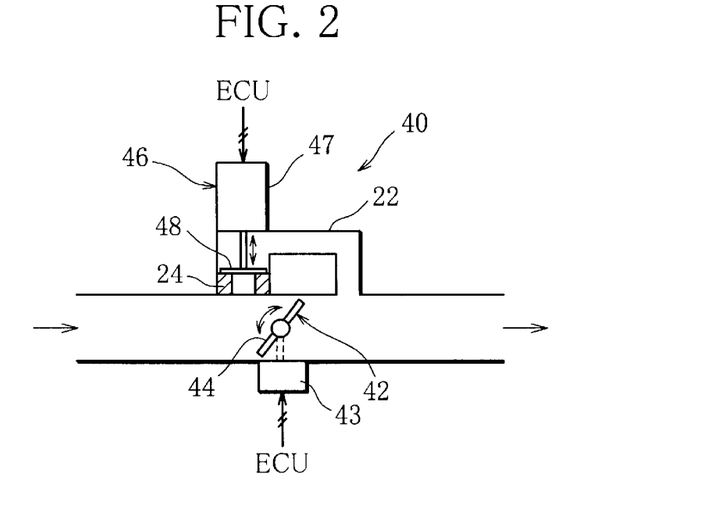
FIG. 2 is a diagram showing an exhaust pressure control valve serving as an exhaust gas flow controller.

Referring to FIG. 2, there is illustrated the exhaust pressure control valve 40 in more detail. As shown in the figure, the exhaust pressure control valve 40 comprises a butterfly valve 42 capable of adjusting the flow area of the exhaust pipe 20, and a relief valve 46.

The butterfly valve 42 is associated with an actuator 43 for rotating a valve element 44. As the valve element 44 is rotated by the actuator 43, the butterfly valve 42 opens or closes to vary the cross-sectional area of the exhaust passage, thereby restraining the exhaust gas flow.

Also, a relief passage 22 is formed so as to bypass the butterfly valve 42, and the relief valve 46 is capable of finely adjusting the cross-sectional area of the relief passage 22. More specifically, the relief valve 46 is associated with an actuator 47 for reciprocating a valve element 48. When the valve element 48 is brought into contact with a valve seat 24 by the actuator 47, the relief passage 22 is closed, and the flow rate of the exhaust gas flowing through the relief passage 22 is finely adjusted in accordance with the distance of separation between the valve element 48 and the valve seat 24. Namely, by adjusting the valve opening of the relief valve 46, it is possible to vary a restraint quantity for restraining the exhaust gas flow. Alternatively, a spring or the like may be used in place of the actuator 47 so that the relief valve 46 may be automatically controlled by the spring or the like.

An ECU 60 comprises input/output devices, storage devices (ROM, RAM, nonvolatile RAM, etc.), a central processing unit (CPU), timer/counters, etc., and carries out integrated control of the exhaust gas purifying device including the engine 1.

The input side of the ECU 60 is connected with various sensors such as the intake air quantity sensor 16 and the exhaust pressure sensor 22 mentioned above, as well as a crank angle sensor 62 for detecting the crank angle of the engine. Detection information from these sensors is input to the ECU. Also, based on crank angle information from the crank angle sensor 62, an engine rotational speed Ne is obtained.

On the other hand, the output side of the ECU 60 is connected with various output devices such as the fuel injection valves 6, the ignition coil 8, the throttle valve 14 and the actuators 43 and 47 mentioned above. The ECU 60 sets the fuel injection mode and also a burn air/fuel ratio, i.e. target air/fuel ratio (target A/F), whereupon signals indicative of fuel injection quantity, fuel injection timing, ignition timing and throttle opening calculated based on the target A/F and the detection information from the various sensors are output to the corresponding output devices (fuel injection control means, air/fuel ratio control means). As a result, proper amounts of fuel are injected from the fuel injection valves 6 at proper timing, the spark plugs 4 spark at proper timing, and also the opening of the throttle valve 14 is set to a proper opening. Also, in accordance with the fuel injection mode and the detection information from the various sensors, the butterfly valve 42 is opened and closed at proper timing and also the opening of the relief valve 46 is finely adjusted so that the degree to which the exhaust gas flow is restrained may become equal to a desired restraint degree (e.g. target exhaust pressure).

Operation of the exhaust gas purifying device of the present invention, constructed as mentioned above, will be now described.

A first embodiment will be explained first.

Figure 3:
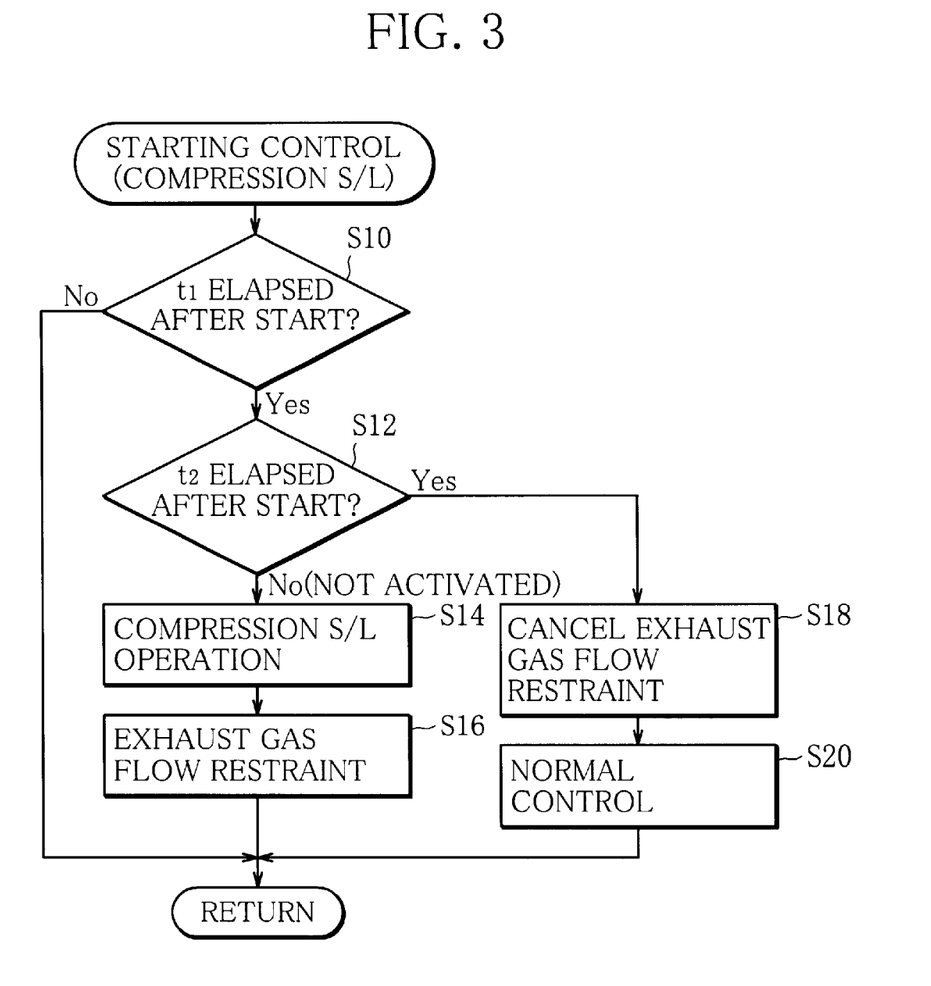
FIG. 3 is a flowchart showing a starting control routine according to a first embodiment.

FIG. 3 is a flowchart illustrating a starting control routine according to the present invention. In the following, the control routine will be described with reference to the flowchart.

In Step S10, it is determined whether or not a predetermined time $t_1$ (e.g. 3 sec) has elapsed after the start of the engine 1. Specifically, at the start of the engine 1, exhaust port temperature increase control, such as ignition timing retardation for retarding the ignition timing, is carried out, and the above determination is made to determine whether or not the exhaust system, in particular, the exhaust ports 11 have been warmed up after the start of the engine 1 to an extent such that the temperature of or ambient temperature of the exhaust ports 11 is higher than or equal to a predetermined temperature (exhaust port ambient temperature detecting means).

A sensor for detecting the temperature of or ambient temperature of the exhaust port 11 may be provided, and the detected temperature of the exhaust port 11 may be directly compared with the predetermined temperature, instead of making the determination as to passage of time. Alternatively, termination of the exhaust port temperature increase control may be regarded as a lapse of the predetermined time.

If the decision in Step S10 is negative (No), the routine is ended. On the other hand, if the decision is affirmative (Yes), that is, if it is judged that the predetermined time $t_1$ has elapsed, the flow proceeds to Step S12.

In Step S12, it is determined whether or not a predetermined time $t_2$ (e.g. 45 sec to 2 min) has elapsed after the start of the engine 1 (catalyst activation determining means). If the decision is negative (No), that is, if the predetermined time $t_2$ has not yet elapsed and thus the three-way catalyst 30 is not in an activated state yet, the flow proceeds to Step S14.

In Step S14, compression-stroke slight-lean operation (in FIG. 3, abbreviated as compression S/L operation) is carried out (compression-stroke slight-lean operation means) wherein the target A/F is set to a slight lean air/fuel ratio (ratio optimized for the engine and the exhaust system, e.g. 15) which provides an air/fuel mixture slightly leaner than the stoichiometric air/fuel mixture and also fuel is injected in the compression stroke. In practice, with the target A/F set at the stoichiometric air/fuel ratio, the control gain of air/fuel ratio feedback control is shifted to the leaner side of air/fuel ratio. Alternatively, the control gain may be left unchanged with the target A/F set at the stoichiometric air/fuel ratio. The ignition timing and the timing for fuel injection in the compression stroke are previously optimized so as to best accelerate the reaction in the exhaust ports 11 and, in the present invention, are obtained as map values selected in accordance with operating conditions (one or more selected from engine speed Ne, volumetric efficiency, brake mean effective pressure, indicated mean effective pressure, manifold pressure, throttle valve opening, exhaust port ambient temperature, cooling water temperature, intake air quantity, and exhaust gas flow rate).

In Step S16, the actuators 43 and 47 are controlled to operate the exhaust pressure control valve 40, that is, the butterfly valve 42 and the relief valve 46, in the closing direction (exhaust gas flow control means). Specifically, the butterfly valve 42 is closed while the opening of the relief valve 46 is finely adjusted so that the degree to which the exhaust gas flow is restrained may become equal to a desired restraint degree. Consequently, the flow of exhaust gas in the exhaust system on the upstream side of the exhaust pressure control valve 40 is controlled to the desired restraint degree, with the result that the exhaust pressure increases.

Where the compression-stroke slight-lean operation is carried out with the exhaust gas flow restrained in this manner, the spark plugs 4 are rarely wetted, because fuel injected during the compression-stroke slight-lean operation can form a satisfactory spray pattern as mentioned above, and also a large quantity of CO is produced. CO thus produced is discharged into the exhaust system together with the residual $O_2$ that was not utilized for the combustion, and the reaction of CO with the residual $O_2$ is appropriately accelerated in the exhaust system, especially inside the exhaust ports 11. By this time, the exhaust ports 11 are already warmed up to a certain degree, as confirmed by the decision in Step S10, and accordingly, the reaction of CO with the residual $O_2$ in the exhaust ports 11 is accelerated satisfactorily.

Thus, sufficient amounts of CO and $O_2$ can be made to be present in the exhaust system and the reaction of CO with the residual $O_2$ can be appropriately accelerated in the exhaust system, even though no auxiliary injection of two-stage combustion is performed. It is therefore unnecessary to supply fuel that does not contribute to the engine torque, thus restraining the fuel efficiency from lowering, while at the same time the HC emission quantity can be restrained to improve the exhaust gas purifying efficiency and also the exhaust temperature can be adequately increased to quicken the activation of the three-way catalyst 30, as indicated by the solid lines in FIG. 4.

Figure 4:
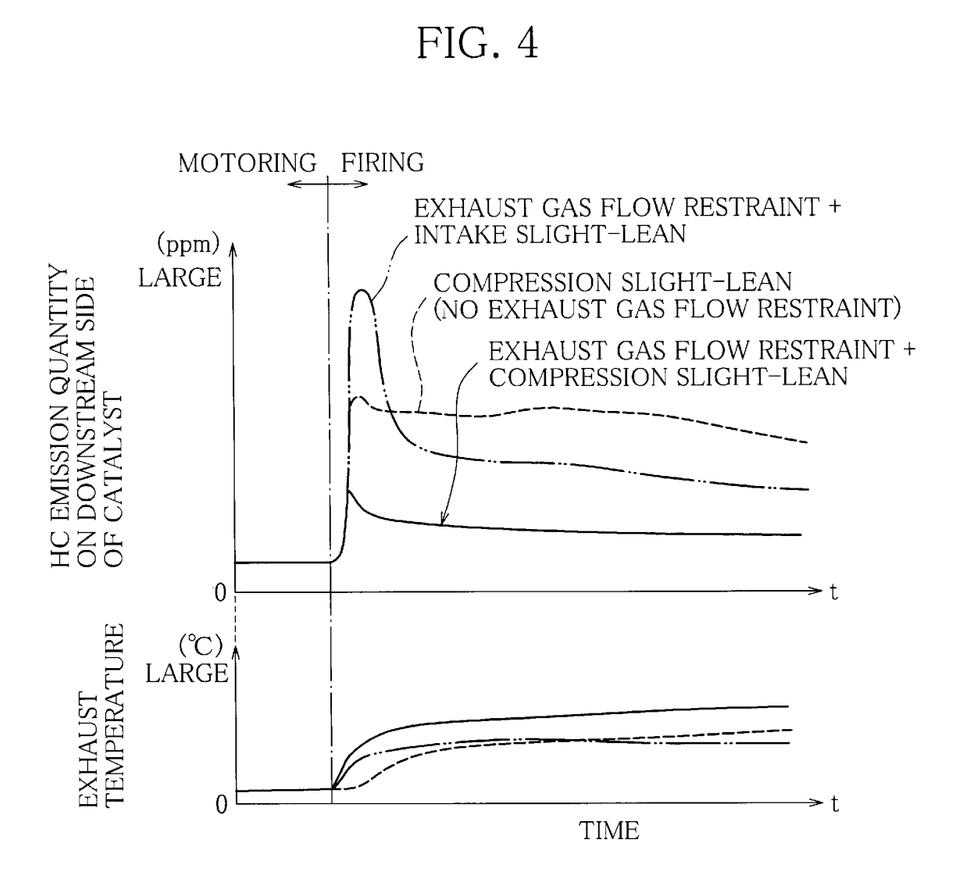
FIG. 4 is a time chart showing time-based changes in HC emission quantity and exhaust temperature when the starting control according to the first embodiment is carried out.

In FIG. 4, the broken lines indicate the HC emission quantity and exhaust temperature observed when the compression-stroke slight-lean operation is performed without restraining the exhaust gas flow, and the two-dot chain lines indicate the HC emission quantity and exhaust temperature observed when the exhaust gas flow is restrained and fuel is injected in the intake stroke with the target A/F set to a slight lean air/fuel ratio (intake-stroke slight-lean operation). When the compression-stroke slight-lean operation is performed while restraining the exhaust gas flow, the HC emission quantity can be kept at a low level and also the exhaust temperature can be raised, as indicated by the solid lines, compared with the case where the compression-stroke slight-lean operation alone is performed or the case where the intake-stroke slight-lean operation is performed. Also, by performing the compression-stroke slight-lean operation, it is possible to restrain the HC emission quantity from suddenly increasing immediately after the start of the engine, which phenomenon occurs in the intake-stroke slight-lean operation.

Further, in cases where the two-stage combustion is carried out while the compression-stroke slight-lean operation is performed with the exhaust gas flow restrained, there is a limit to the engine torque that can be produced, because the air/fuel ratio of the mixture burned in the main combustion following the main injection needs to be set to an ultra-lean air/fuel ratio, and increase of the exhaust resistance due to the exhaust gas flow restraint makes it difficult even to maintain the limit. However, with the slight lean air/fuel ratio, sufficient engine torque can be produced, and even if acceleration is demanded immediately after the starting, sufficiently high acceleration performance can be ensured.

On the other hand, if the decision in Step S12 is affirmative (Yes), that is, if it is judged that the predetermined time $t_2$ (e.g. 45 sec to 2 min) has elapsed, the flow proceeds to Step S18. Namely, Step S12 is executed in order to determine whether or not the exhaust gas flow restraint and the compression-stroke slight-lean operation should be terminated. If it is judged that the predetermined time $t_2$ has elapsed, the three-way catalyst 30 is then fully activated due to increase of the exhaust temperature and it is no longer necessary to carry out the exhaust gas flow restraint and the compression-stroke slight-lean operation; accordingly, the flow proceeds to Step S18.

In Step S18, the exhaust pressure control valve 40, that is, the butterfly valve 42, is operated in the opening direction to cancel the exhaust gas flow restraint. Then, in Step S20, the compression-stroke slight-lean operation is terminated and the combustion control for the engine 1 is restored to normal control.

A second embodiment will be now described.

Figure 5:
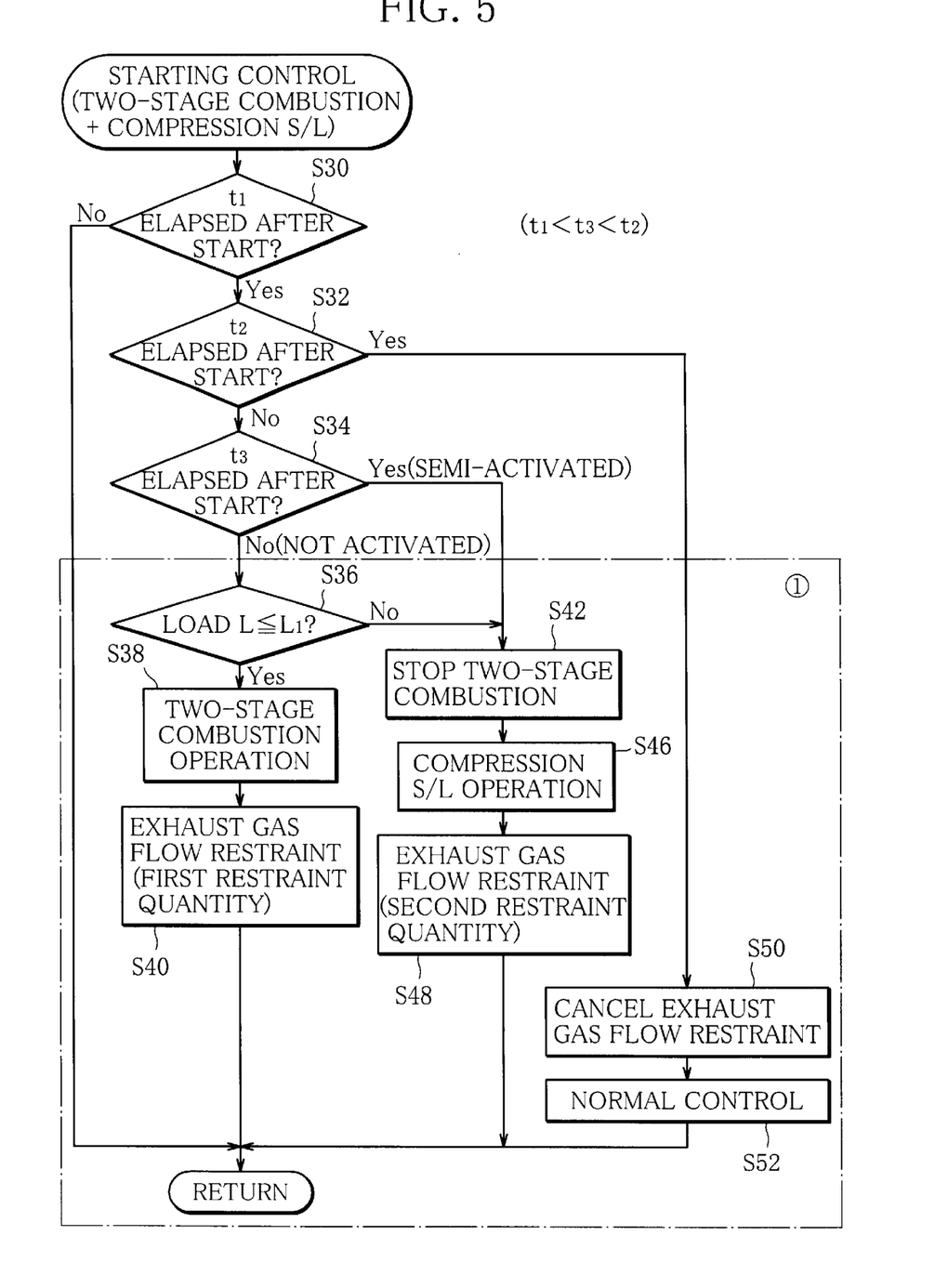
FIG. 5 is a flowchart showing a starting control routine according to a second embodiment.

FIG. 5 is a flowchart showing a starting control routine according to the second embodiment of the present invention, and in the following, the second embodiment will be explained with reference to the flowchart. The second embodiment differs from the first embodiment primarily in that the compression-stroke slight-lean operation is carried out following two-stage combustion operation.

In Step S30, it is determined whether or not the predetermined time $t_1$ (e.g. 3 sec) has elapsed after the start of the engine 1, as in Step S10 in FIG. 3. Specifically, it is determined whether or not the exhaust system, in particular, the exhaust ports 11 have been warmed up after the start of the engine 1 to an extent such that the temperature of or ambient temperature of the exhaust ports 11 is higher than or equal to a predetermined temperature. If the decision is negative (No), the routine is ended; if the decision is affirmative (Yes) and thus it is judged that the predetermined time $t_1$ has elapsed, the flow proceeds to Step S32.

In Step S32, it is determined whether or not the predetermined time $t_2$ (e.g. 45 sec to 2 min) has elapsed after the start of the engine 1 (catalyst activation determining means), as in Step S12 in FIG. 3. If the decision is negative (No), that is, if the predetermined time $t_2$ has not yet passed and thus the three-way catalyst 30 is not activated yet, the flow proceeds to Step S34.

In Step S34, it is determined whether or not a predetermined time $t_3$ (e.g. 15 sec) has elapsed after the start of the engine 1. Namely, a determination is made as to whether or not the state of the three-way catalyst 30 has reached a semi-activated state (state just before a fully activated state). If the decision is negative (No), that is, if the predetermined time $t_3$ has not yet passed and thus the three-way catalyst 30 is not in the semi-activated state yet, the flow proceeds to Step S36.

In Step S36, it is determined whether or not an engine load L takes a value lower than or equal to a predetermined value $L_1$, that is, whether or not acceleration of the engine 1 has been demanded. The engine load L is detected based on, for example, the opening of the throttle valve 14, that is, throttle opening. Alternatively, a pressure sensor may be arranged in the intake manifold 12 so that the engine load may be detected based on the pressure in the intake manifold 12, that is, intake manifold pressure, or the engine load may be detected based on the intake air quantity information from the intake air quantity sensor 16.

If the decision in Step S36 is affirmative (Yes), that is, if it is judged that the engine load L is smaller than or equal to the predetermined value $L_1$ and thus that acceleration of the engine 1 is not being demanded, the flow proceeds to Step S38.

In Step S38, two-stage combustion operation is performed, that is, main combustion of the mixture produced by main injection is carried out in the compression stroke and auxiliary injection is carried out in or after the expansion stroke (two-stage combustion operation means). In this case, the main injection quantity is set such that the air/fuel mixture burned by the main combustion has an ultra-lean air/fuel ratio, whereas the auxiliary injection quantity is set such that the air/fuel mixture as a whole has a predetermined lean air/fuel ratio (e.g. 16). The auxiliary fuel injection timing is set, most desirably, at a time after the extinction of flame and before the opening action of exhaust valves.

Where the two-stage combustion operation is performed in this manner, the fuel efficiency somewhat lowers by an amount corresponding to the auxiliary injection quantity, because fuel injected by the auxiliary injection does not directly contribute to the production of engine torque, but the reaction of unburned fuel components (HC etc.) supplied by the auxiliary injection with the residual $O_2$ remaining after the main combustion (stratified combustion) can be made to rapidly take place in the exhaust system. As a consequence, the exhaust temperature rapidly rises and thus the catalyst can be activated quickly.

In Step S40, the actuators 43 and 47 are controlled, as in Step S16 in FIG. 3, to operate the exhaust pressure control valve 40, that is, the butterfly valve 42 and the relief valve 46, in the closing direction. In this case, the butterfly valve 42 is closed, while the opening of the relief valve 46 is automatically varied by a first restraint quantity, for example, so that the degree to which the exhaust gas flow is restrained may become equal to a desired restraint degree (e.g. target exhaust pressure). As a result, the exhaust gas flow in the exhaust system on the upstream side of the exhaust pressure control valve 40 is controlled to the desired restraint degree, and thus the exhaust pressure increases.

On the other hand, if the decision in Step S34 is affirmative (Yes), that is, if it is judged that the predetermined time $t_3$ has elapsed and thus that the three-way catalyst 30 has been semi-activated, the flow proceeds to Step S42.

Once the three-way catalyst 30 is semi-activated, the catalyst 30 will soon be fully activated even if the exhaust temperature is not so high. In Step S42, therefore, the two-stage combustion operation is stopped.

In Step S46, the compression-stroke slight-lean operation (in FIG. 5, abbreviated as compression S/L operation) is carried out, as in Step S14 in FIG. 3.

Thus, where the two-stage combustion operation is carried out first and after the three-way catalyst 30 is semi-activated, the compression-stroke slight-lean operation is performed, sufficient engine torque can be secured on as many occasions as possible to ensure acceleration performance while at the same time quickening the activation of the three-way catalyst 30 and also restraining the fuel efficiency from lowering. As a consequence, the exhaust gas purifying efficiency can be effectively improved as a whole.

In Step S48, the exhaust gas flow is restrained, as in Step S40 explained above. In this case, however, the butterfly valve 42 is closed, while the opening of the relief valve 46 is automatically reduced by a predetermined second restraint quantity greater than the aforementioned first restraint quantity (second restraint quantity > first restraint quantity) so that the degree to which the exhaust gas flow is restrained may become equal to a desired restraint degree (e.g. target exhaust pressure). Specifically, during the two-stage combustion operation in which the air/fuel ratio for the main combustion is set to an ultra-lean air/fuel ratio, the intake air quantity is large and thus the exhaust gas flow rate is high. Thus, even if the restraint quantity for restraining the exhaust gas flow is relatively small, the exhaust gas flow can be easily restrained to accelerate the reaction in the exhaust system. However, during the compression-stroke slight-lean operation, the exhaust gas flow rate is low, and therefore, the second restraint quantity for restraining the exhaust gas flow is set larger than the first restraint quantity, to reliably restrain the exhaust gas flow.

Consequently, also during the compression-stroke slight-lean operation, an exhaust gas flow restraint degree equivalent to that applied to the two-stage combustion operation can be maintained, whereby the exhaust gas purifying efficiency can be more effectively improved while restraining the fuel efficiency from lowering and also ensuring the engine torque.

Step S42 and the following steps are executed also when the decision in Step S36 is negative (No), that is, when it is judged that the engine load L is greater than the predetermined value $L_1$. Namely, if acceleration of the engine 1 is demanded even while the two-stage combustion operation is under execution, the operation mode is switched to the compression-stroke slight-lean operation whereby greater engine torque can be secured. This makes it possible to achieve sufficiently high acceleration performance with good response in compliance with the acceleration demand.

If the decision in Step S32 is affirmative (Yes), that is, if it is judged that the predetermined time $t_2$ (e.g. 45 sec to 2 min) has elapsed, then it can be concluded that the three-way catalyst 30 has been completely activated due to sufficiently high exhaust temperature. In this case, therefore, the flow proceeds to Step S50, in which the exhaust pressure control valve 40, that is, the butterfly valve 42 and the relief valve 46, are operated in the opening direction to cancel the exhaust gas flow restraint, as in Step S18 in FIG. 3, and in Step S52, the compression-stroke slight-lean operation is terminated, so that the combustion control for the engine 1 is restored to normal control.

A third embodiment will be now described.

Figure 6:
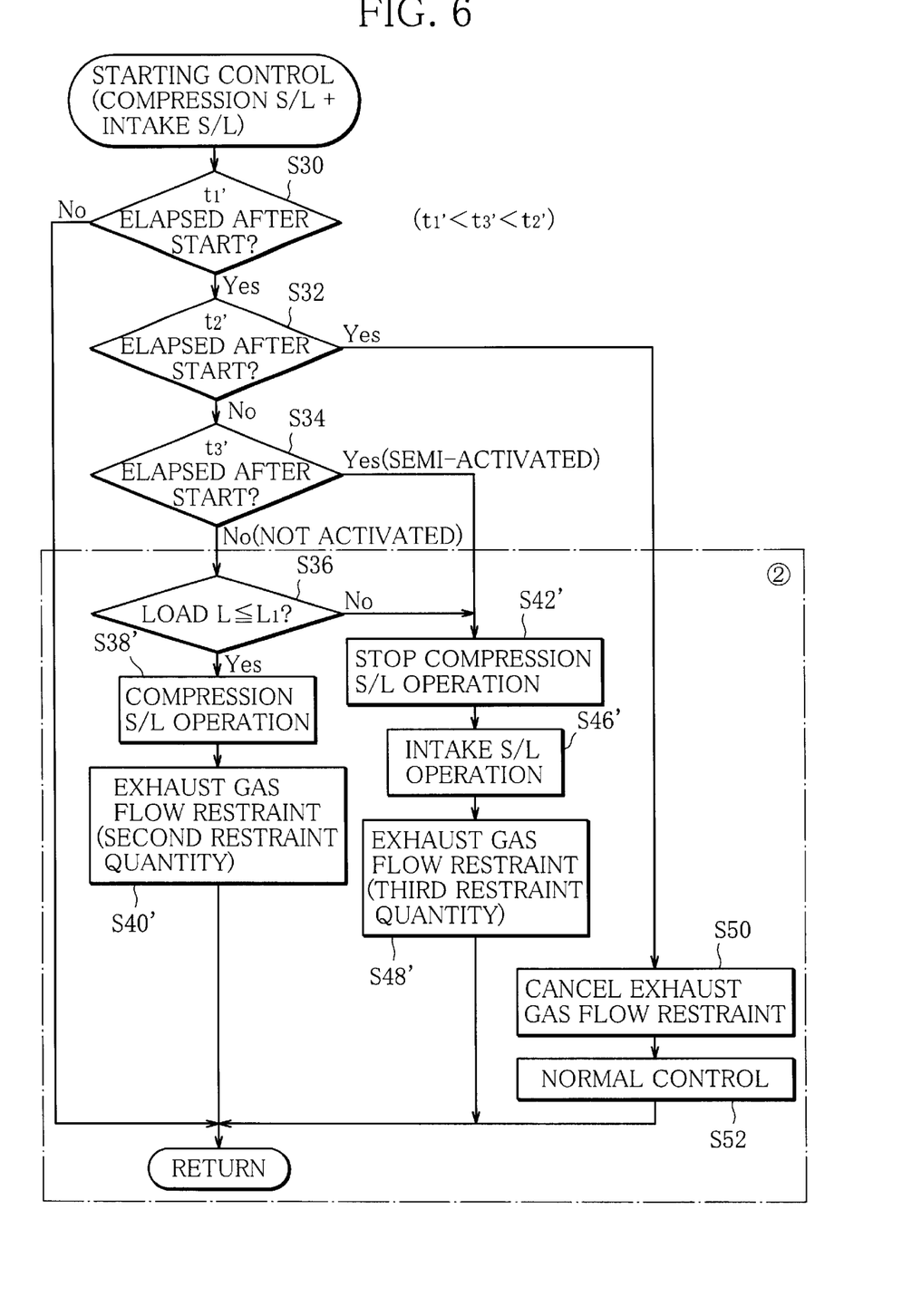
FIG. 6 is a flowchart showing a starting control routine according to a third embodiment.

FIG. 6 is a flowchart showing a starting control routine according to the third embodiment of the present invention, and in the following, the third embodiment will be explained with reference to the flowchart. The third embodiment differs from the second embodiment in that the compression-stroke slight-lean operation is carried out first, followed by intake-stroke slight-lean operation. Accordingly, identical step numbers are used to denote steps identical with those in the second embodiment, and description of such steps is omitted. In the following, only differences will be described.

After the determination in Step S30 as to whether a predetermined time $t_1'$ has elapsed or not, the determination in Step S32 as to whether a predetermined time $t_2'$ has elapsed or not, and the determination in Step S34 as to whether a predetermined time $t_3'$ has elapsed or not, if the decision in Step S36 is affirmative (Yes), that is, if it is judged that the engine load L is smaller than or equal to the predetermined value $L_1$ and thus that acceleration of the engine 1 is not being demanded, the flow proceeds to Step S38'. The predetermined times $t_1'$, $t_2'$ and $t_3'$ are set to respective optimum values and may be equal to the aforementioned predetermined times $t_1$, $t_2$ and $t_3$, respectively.

In Step S38', the compression-stroke slight-lean operation is carried out (in FIG. 6, abbreviated as compression S/L operation).

Then, in Step S40', the butterfly valve 42 is closed, while the opening of the relief valve 46 is automatically adjusted by the predetermined second restraint quantity so that the degree to which the exhaust gas flow is restrained may become equal to a desired restraint degree (e.g. target exhaust pressure), as in Step S48 in FIG. 5. As a consequence, the exhaust gas flow in the exhaust system on the upstream side of the exhaust pressure control valve 40 is restrained to the desired restraint degree, with the result that the exhaust pressure rises.

On the other hand, if the decision in Step S34 is affirmative (Yes), that is, if the predetermined time $t_3'$ has elapsed and thus it is judged that the three-way catalyst 30 has been semi-activated, or if the decision in Step S36 is negative (No) and thus it is judged that the engine load L is larger than the predetermined value $L_1$, the flow proceeds to Step S42', in which the compression-stroke slight-lean operation is stopped.

Then, in Step S46', intake-stroke slight-lean operation (in FIG. 6, abbreviated as intake S/L operation) is carried out, wherein the target A/F is set to a slight lean air/fuel ratio (e.g. 15; the value is, however, not necessarily be equal to that applied to the compression-stroke slight-lean operation) which provides an air/fuel mixture slightly leaner than the stoichiometric air/fuel mixture and fuel is injected in the intake stroke.

In this manner, the compression-stroke slight-lean operation is carried out first and after the three-way catalyst 30 is semi-activated, the intake-stroke slight-lean operation is performed. Greater engine torque is obtained by the intake-stroke slight-lean operation than by the compression-stroke slight-lean operation. Consequently, sufficient engine torque can be secured on even more occasions to ensure the acceleration performance while at the same time restraining the fuel efficiency from lowering, and the exhaust gas purifying efficiency can be effectively improved as a whole while preferentially securing the acceleration performance.

In Step S48', the exhaust gas flow is restrained, as in Step S40' explained above. In this case, however, the butterfly valve 42 is closed, while the opening of the relief valve 46 is automatically reduced by a predetermined third restraint quantity greater than the aforementioned second restraint quantity (third restraint quantity>second restraint quantity) so that the degree to which the exhaust gas flow is restrained may become equal to a desired restraint degree (e.g. target exhaust pressure). Specifically, during the compression-stroke slight-lean operation, stratified combustion is carried out and thus the exhaust gas flow rate is relatively high, but during the intake-stroke slight-lean operation, uniform combustion is carried out and thus the exhaust gas flow rate is low. Therefore, the third restraint quantity for restraining the exhaust gas flow is set larger than the second restraint quantity, to reliably restrain the exhaust gas flow.

Consequently, also during the intake-stroke slight-lean operation, an exhaust gas flow restraint degree equivalent to that applied to the compression-stroke slight-lean operation can be maintained, whereby the exhaust gas purifying efficiency can be more effectively improved while restraining the fuel efficiency from lowering and also ensuring sufficient engine torque.

If the decision in Step S32 is affirmative (Yes), that is, if it is judged that the predetermined time $t_2'$ has elapsed, the flow proceeds to Step S50, as in the foregoing embodiments, in which the exhaust pressure control valve 40, that is, the butterfly valve 42 and the relief valve 46, are operated in the opening direction to cancel the exhaust gas flow restraint, and in Step S52, the intake-stroke slight-lean operation is terminated, so that the combustion control for the engine 1 is restored to normal control.

A fourth embodiment will be now described.

Figure 7:
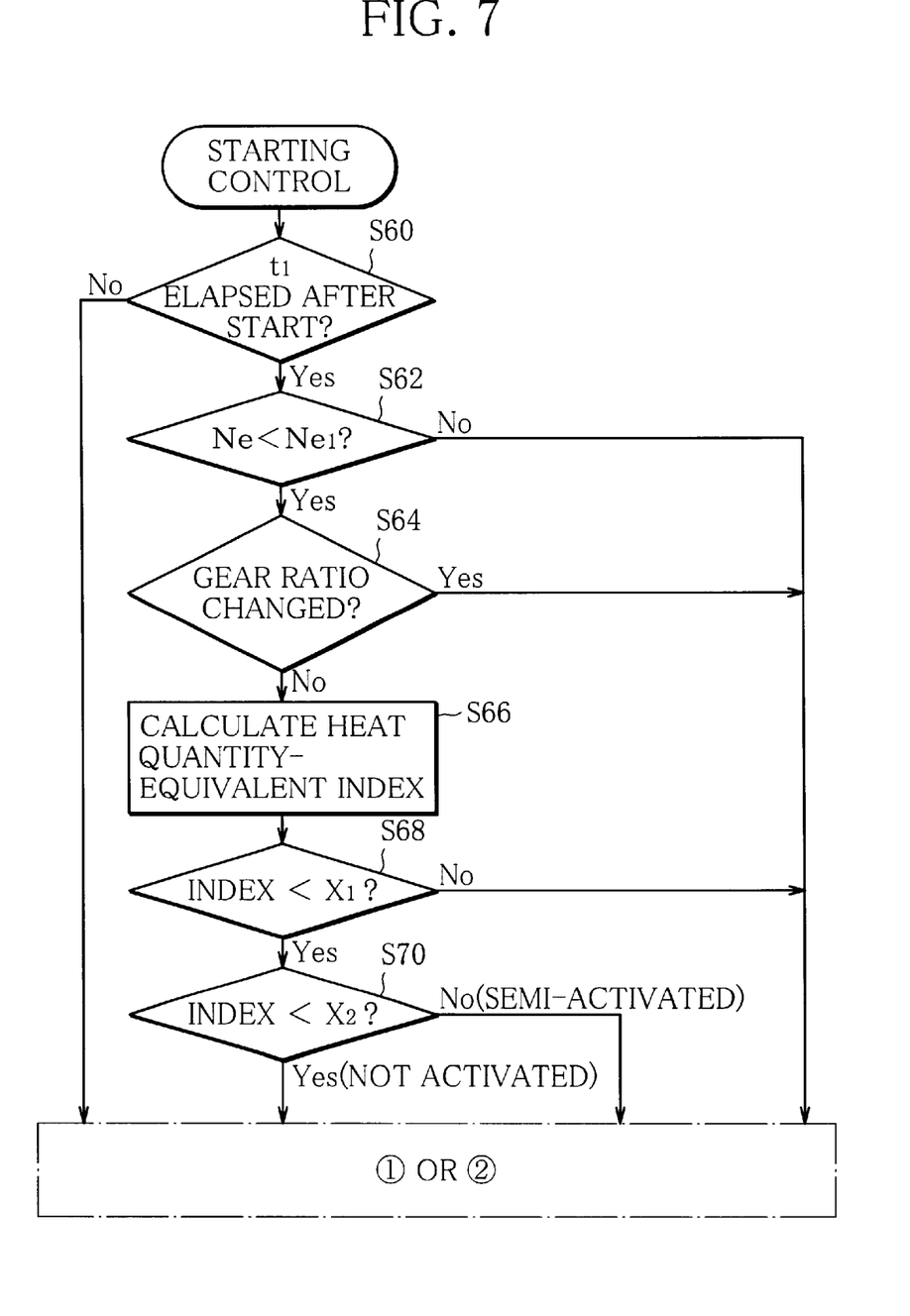
FIG. 7 is a flowchart showing a starting control routine according to a fourth embodiment.

FIG. 7 is a flowchart showing a starting control routine according to the fourth embodiment of the present invention, and in the following, the fourth embodiment will be explained with reference to the flowchart. The fourth embodiment is different in the determination as to termination of the starting control and the determination as to semi-activated state (Steps S60 to S70) from the second and third embodiments (Steps S30 to S34 in FIGS. 5 and 6). Accordingly, description of that part of the flowchart (part 1 in FIG. 5 and part ② in FIG. 6) which is identical with the corresponding part in the second and third embodiments is omitted, and only differences will be described.

In Step S60, it is determined whether or not the predetermined time $t_1$ (e.g. 3 sec) has elapsed after the start of the engine 1, as in Step S30 explained above. If the decision is affirmative (Yes), the flow proceeds to Step S62.

In Step S62, it is determined whether or not the engine speed Ne is lower than a predetermined value $Ne_1$ (e.g. 2200 rpm). If the engine speed Ne is as high as the predetermined value $Ne_1$ or above, the flow rate and flow velocity of the exhaust gas are high, and thus it can be concluded that the three-way catalyst 30 has been sufficiently heated and activated. Accordingly, if the decision in Step S62 is affirmative (Yes) and thus the engine speed Ne is lower than the predetermined value $Ne_1$, the flow proceeds to Step S64; on the other hand, if the decision is negative (No), the flow proceeds to the aforementioned Step S50 to cancel the exhaust gas flow restraint, and in Step S52 also explained above, the compression-stroke slight-lean operation or the intake-stroke slight-lean operation is terminated, so that the combustion control for the engine 1 is restored to normal control.

In Step S64, it is determined whether or not the gear ratio of a transmission (not shown) connected to the engine 1 has been changed. At the start of the engine, the motor vehicle is usually standing still and it can be concluded that the gear ratio is set at the lowest-speed gear ratio (low gear). Accordingly, a change of the gear ratio from this state can be regarded as a gear ratio change to a higher-speed side with increase in the vehicle speed. If the vehicle speed increases, the engine speed Ne also increases, with the result that the flow rate and flow velocity of the exhaust gas become high. It can therefore be concluded that the three-way catalyst 30 has been sufficiently heated and activated, as in the aforementioned case. Thus, if the decision in Step S64 is negative (No), that is, if it is judged that there has been no change in the gear ratio of the transmission, the flow proceeds to Step S66; on the other hand, if the decision is affirmative (Yes) and thus it is judged that the gear ratio of the transmission has been changed, Steps S50 and S52 are executed as in the aforementioned case.

In Step S66, a heat quantity-equivalent index is calculated. This index is equivalent to a total quantity of heat (total heat quantity) applied to the three-way catalyst 30 since the exhaust gas flow restraint and the compression-stroke slight-lean operation were started. Specifically, the index is obtained according to the computing equation below.

Index=Integrated value{Exhaust gas (volume) flow rate×Exhaust pressure×Exhaust temperature×Exhaust pressure coefficient}

The parameters of exhaust gas (volume) flow rate and exhaust pressure can be detected by the aforementioned intake air quantity sensor 16 and exhaust pressure sensor 22, respectively. The exhaust temperature may be obtained from among map values set beforehand in accordance with operating conditions. Alternatively, an exhaust temperature sensor may be provided to directly detect the exhaust temperature.

Figure 8:
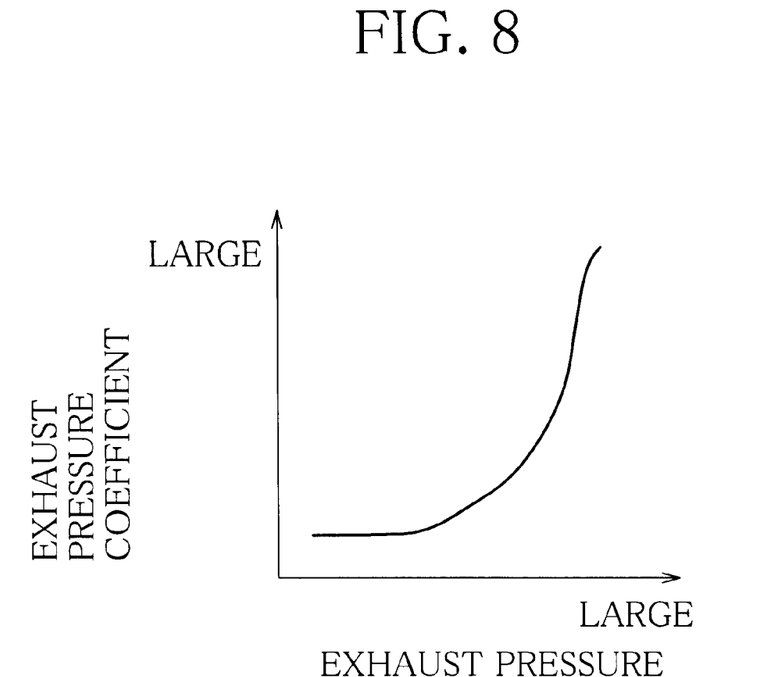
FIG. 8 is a map showing the relationship between exhaust pressure and exhaust pressure coefficient used in calculating a heat quantity-equivalent index.

The exhaust pressure coefficient is an exhaust pressure correction coefficient for optimizing the value equivalent to the total heat quantity applied to the three-way catalyst 30, and may be obtained from a map shown in FIG. 8, for example. As seen from the map, the correction coefficient increases with increase in the exhaust pressure. This is because the higher the exhaust pressure, the more readily substances ($H_2$, HC, CO, etc.) to be converted inside the three-way catalyst 30 diffuse into the catalyst 30 to increase the reaction rate, so that the quantity of heat produced by the reaction of such substances in the three-way catalyst 30 tends to increase.

After the heat quantity-equivalent index is calculated, it is determined in Step S68 whether or not the index is smaller than a predetermined value $X_1$. If the decision is affirmative (Yes), that is, if the index is smaller than the predetermined value $X_1$, the flow proceeds to Step S70. On the other hand, if the decision is negative (No), that is, if the index is greater than or equal to the predetermined value $X_1$, it can be concluded that the three-way catalyst 30 has been sufficiently heated and activated, and accordingly, Steps S50 and S52 are executed as in the aforementioned case.

In Step S70, it is determined whether or not the index is smaller than a predetermined value $X_2$ ($X_2<X_1$). Namely, it is determined whether or not the three-way catalyst 30 is semi-activated by having been applied with a total heat quantity not so large as the predetermined value $X_1$ but equivalent to the predetermined value $X_2$. If the decision is affirmative (Yes), that is, if it is judged that the index is smaller than the predetermined value $X_2$, the flow proceeds to Step S36 explained above.

On the other hand, if the decision in Step S70 is negative (No), that is, if the index is greater than or equal to the predetermined value $X_2$ and thus it is judged that the three-way catalyst 30 is in a semi-activated state, the flow proceeds to Step S42 or S42' explained above.

In this manner, the determination as to termination of the starting control and the determination as to semi-activated state can be easily made on the basis of the engine speed Ne, change in the gear ratio of the transmission, and the heat quantity-equivalent index. Also in this case, the exhaust gas purifying efficiency can be effectively improved while restraining the fuel efficiency from lowering and at the same time securing the engine torque.

The determination as to termination of the starting control may be made by various other methods. For example, the three-way catalyst 30 may be provided with a high-temperature sensor and a determination at to whether the catalyst temperature detected by the high-temperature sensor takes a value higher than or equal to a predetermined temperature (e.g. 450° C.) or not (catalyst temperature≧predetermined temperature) may be made to determine whether to terminate the starting control. Alternatively, whether the cooling water temperature of the engine 1 takes a value higher than or equal to a predetermined temperature (e.g. 40° C.) or not (cooling water temperature≧predetermined temperature) or whether the lubricating oil temperature of the engine 1 takes a value higher than or equal to a predetermined temperature (e.g. 35° C.) or not (lubricating oil temperature≧predetermined temperature) may be determined to thereby determine whether to terminate the starting control.

Similarly, the determination as to semi-activated state may also be made by various other methods. For example, the three-way catalyst 30 may be provided with a high-temperature sensor and a determination at to whether the catalyst temperature detected by the high-temperature sensor takes a value higher than or equal to a predetermined temperature (e.g. 300° C.) or not (catalyst temperature≧predetermined temperature) may be made to determine the semi-activated state. Alternatively, whether the cooling water temperature of the engine 1 takes a value higher than or equal to a predetermined temperature (e.g. 29° C.) or not (cooling water temperature≧predetermined temperature) or whether the lubricating oil temperature of the engine 1 takes a value higher than or equal to a predetermined temperature (e.g. 27° C.) or not (lubricating oil temperature≧predetermined temperature) may be determined to thereby determine the semi-activated state.

While the present invention has been described, it is to be noted that the present invention is not limited to the foregoing embodiments alone.

For example, although in the above embodiments the exhaust pressure control valve 40 is used to control the degree to which the exhaust gas flow is restrained, any other means may be used insofar as it can control the amount of reduction of the exhaust passage area or the cross-sectional area of the exhaust passage. In this case, in the second to fourth embodiments, the amount of reduction of the exhaust passage area or the cross-sectional area of the exhaust passage is controlled to respective values corresponding to the first, second, and third restraint quantities (third restraint quantity >second restraint quantity >first restraint quantity).

Also, in the above embodiments, the restraint quantities for restraining the exhaust gas flow, such as the first, second, and third restraint quantities, are set at fixed values by way of example, but the restraint quantities may be finely adjusted as required in accordance with variations in the exhaust gas flow rate or the exhaust temperature.

Further, in the second to fourth embodiments, when the decision in Step S36 is negative (No), that is, when it is judged that the engine load L is higher than the predetermined value $L_1$ and thus that acceleration has been demanded, the operation mode is switched to the compression-stroke slight-lean operation or the intake-stroke slight-lean operation. If the operation mode thus switched to still fails to provide the demanded engine torque, Step S52 may be executed to carry out normal control and, in this case, the exhaust gas flow may be restrained as needed.

Also, in the second to fourth embodiments, the operation mode is switched from the two-stage combustion operation to the compression-stroke slight-lean operation or from the compression-stroke slight-lean operation to the intake-stroke slight-lean operation. However, in cases where the catalyst activation should preferentially be quickened, the two-stage combustion operation or the compression-stroke slight-lean operation may be carried out singly without being switched to the compression-stroke slight-lean operation or the intake-stroke slight-lean operation. On the other hand, where the acceleration performance should be given priority, the compression-stroke slight-lean operation or the intake-stroke slight-lean operation may be carried out singly from the outset, without performing the two-stage combustion operation or the compression-stroke slight-lean operation.

In Steps S10, S30, and S60 of the foregoing embodiments, a determination is made as to whether or not the predetermined time $t_1$ (e.g. 3 sec) has elapsed after the start of the engine 1, that is, whether or not the exhaust system has been warmed up after the start of the engine 1 to an extent such that the temperature thereof is higher than or equal to the predetermined temperature. In the case where the exhaust system used has a good response to the restraint of the exhaust gas flow, however, the predetermined time $t_1$ may be set to 0 (zero) seconds and the compression-stroke slight-lean operation or the two-stage combustion operation may be started immediately after complete explosion of the engine 1.

Also, the restraint of the exhaust gas flow, that is, the closing of the exhaust pressure control valve 40, may be initiated at the time when the ignition key is turned on. This solves the problem associated with response delay in the exhaust gas flow restraint.

In the foregoing embodiments, during the compression-stroke slight-lean operation, fuel is injection only in the compression stroke. Alternatively, fuel may be injected during the compression-stroke slight-lean operation in a manner such that fuel is injected not only in the compression stroke but in the intake stroke, for example. In this case, the advantages of both the compression-stroke injection and the intake-stroke injection can be obtained, whereby the acceleration performance can be further enhanced.

In the foregoing description of the embodiments, the exhaust pressure control valve 40 is arranged immediately downstream the three-way catalyst 30. However, in the case where the exhaust pressure control valve 40 has high heat resistance, it may be arranged on the upstream side of the catalyst. This arrangement makes it possible to reduce the volume of that part of the exhaust system which is located on the upstream side of the exhaust pressure control valve 40, also improving the response to the exhaust gas flow restraint.

Also, in the foregoing embodiments, the exhaust pressure control valve 40 has the butterfly valve 42 and the relief valve 46. In the case where the intake-exhaust system is provided with a turbocharger, however, the waste gate valve of the turbocharger may be used in place of the exhaust pressure control valve 40. Specifically, the waste gate valve has a valve function similar to that of the exhaust pressure control valve 40, and accordingly, advantageously effects similar to those described above can be achieved by controlling the waste gate valve in accordance with the degree to which the exhaust gas flow is to be restrained.

Further, although in the above embodiments the three-way catalyst 30 is used as the catalytic converter, any desired catalyst such as lean $NO_x$ catalyst or HC adsorbing catalyst may be used instead.

What is claimed is:

1. An exhaust gas purifying device for an in-cylinder injection spark ignition type internal combustion engine including an injection valve for injecting fuel directly into a combustion chamber, fuel injection control means for controlling the injection of fuel by the injection valve, and air/fuel ratio control means for controlling burn air/fuel ratio, said exhaust gas purifying device comprising:

a catalytic converter arranged in an exhaust passage, for purifying harmful matter in exhaust gas;

catalyst activation determining means for determining an activated state of said catalytic converter;

compression-stroke slight-lean operation means for causing the air/fuel ratio control means to control the burn air/fuel ratio to produce a slight lean air/fuel mixture equivalent to or slightly leaner than a stoichiometric air/fuel mixture and also causing the fuel injection control means to inject fuel in a compression stroke, to thereby carry out a compression-stroke slight-lean operation in which residual oxygen and CO are made to react with each other in an exhaust system of the engine; and exhaust gas flow control means for restraining an exhaust gas flow in the exhaust passage, wherein when it is judged by said catalyst activation determining means that said catalytic converter is not in the activated state, the compression-stroke slight-lean operation is performed by said compression-stroke slight-lean operation means and also the exhaust gas flow in the exhaust passage is restrained by said exhaust gas flow control means.

2. The exhaust gas purifying device according to claim 1, further comprising:

exhaust port ambient temperature detecting means for detecting temperature of or ambient temperature of an exhaust port extending from the combustion chamber to the exhaust passage, wherein when it is judged by said catalyst activation determining means that said catalytic converter is not in the activated state and also the, temperature or ambient temperature of the exhaust port detected by said exhaust port ambient temperature detecting means is higher than or equal to a predetermined temperature, the compression-stroke slight-lean operation is carried out and also the exhaust gas flow is restrained.

3. The exhaust gas purifying device according to claim 1, further comprising:

two-stage combustion operation means for supplying fuel for main combustion into the combustion chamber and then again supplying fuel into the combustion chamber at a time after extinction of flame produced by the main combustion and before opening of an exhaust valve, to thereby carry out a two-stage combustion operation, wherein when it is judged by said catalyst activation determining means that said catalytic converter is not in the activated state, one of the two-stage combustion operation and the compression-stroke slight-lean operation is selectively carried out by said two-stage combustion operation means or said compression-stroke slight-lean operation means, and also the exhaust gas flow is restrained.

4. The exhaust gas purifying device according to claim 3, wherein when it is judged by said catalyst activation determining means that said catalytic converter is not in the activated state, the two-stage combustion operation is carried out first and then the compression-stroke slight-lean operation is carried out.

5. The exhaust gas purifying device according to claim 3, wherein when the compression-stroke slight-lean operation is carried out, said exhaust gas flow control means sets a restraint quantity for restraining the exhaust gas flow to a value greater than that applied when the two-stage combustion operation is carried out.

6. The exhaust gas purifying device according to claim 3, further comprising:

load detecting means for detecting a load on the engine, wherein when the load of the engine detected by said load detecting means is higher than or equal to a predetermined value, the compression-stroke slight-lean operation is carried out preferentially over the two-stage combustion operation.

7. The exhaust gas purifying device according to claim 1, further comprising:

intake-stroke slight-lean operation means for causing the air/fuel ratio control means to control the burn air/fuel ratio to produce a slight lean air/fuel mixture equivalent to or slightly leaner than a stoichiometric air/fuel mixture and also causing the fuel injection control means to inject fuel in an intake stroke, to thereby carry out an intake-stroke slight-lean operation, wherein when it is judged by said catalyst activation determining means that said catalytic converter is not in the activated state, one of the compression-stroke slight-lean operation and the intake-stroke slight-lean operation is selectively carried out by said compression-stroke slight-lean operation means or said intake-stroke slight-lean operation means, and also the exhaust gas flow is restrained.

8. The exhaust gas purifying device according to claim 7, wherein when it is judged by said catalyst activation determining means that said catalytic converter is not in the activated state, the compression-stroke slight-lean operation is carried out first and then the intake-stroke slight-lean operation is carried out.

9. The exhaust gas purifying device according to claim 7, wherein when the intake-stroke slight-lean operation is carried out, said exhaust gas flow control means sets a restraint quantity for restraining the exhaust gas flow to a value greater than that applied when the compression-stroke slight-lean operation is-carried out.

10. The exhaust gas purifying device according to claim 7, further comprising:

load detecting means for detecting a load on the engine, wherein when the load of the engine detected by said load detecting means is higher than or equal to a predetermined value, the intake-stroke slight-lean operation is carried out preferentially over the compression-stroke slight-lean operation.

11. The exhaust gas purifying device according to claim 1, wherein said catalyst activation determining means uses, as a parameter, at least one of time elapsed from start of the engine, temperature of cooling water of the engine, temperature of lubricating oil of the engine, temperature of the catalytic converter, flow rate of the exhaust gas, and total quantity of heat applied to the catalytic converter, to determine the activated state of the catalytic converter.

12. The exhaust gas purifying device according to claim 1, wherein said exhaust gas flow control means reduces either cross-sectional area of the exhaust passage or opening of an exhaust choke valve arranged in the exhaust passage, to thereby restrain the exhaust gas flow in the exhaust passage.

13. The exhaust gas purifying device according to claim 6 or 10, wherein said load detecting means detects the load of the engine based on at least one of throttle valve opening, intake manifold pressure, and intake air quantity.

* * * * *